No. 829,120. PATENTED AUG. 21, 1906.
G. A. MUMFORD.
VALVE FOR CONTROLLING FLUIDS.
APPLICATION FILED JUNE 21, 1905.
2 SHEETS—SHEET 1.
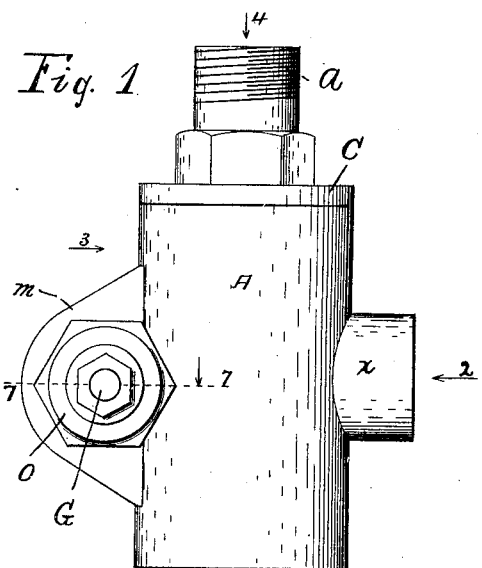
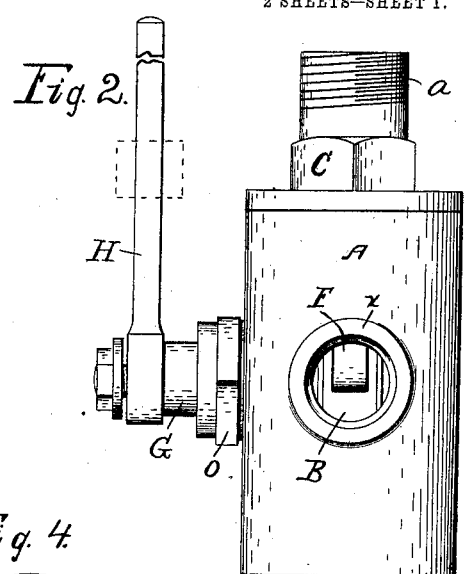
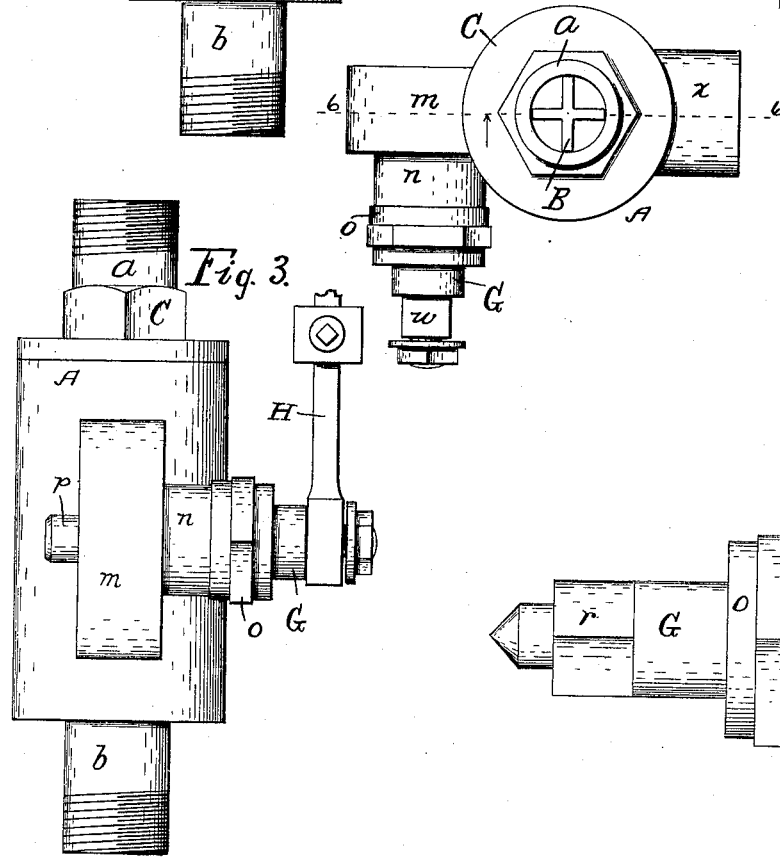
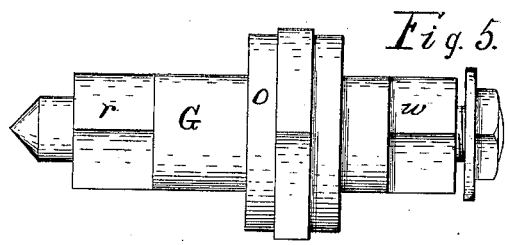
Attest:
M. B. Smith.
A. M. Whitmore.
Inventor:
George A. Mumford
By E. B. Whitrick atty No. 829,120. PATENTED AUG. 21, 1906.
G. A. MUMFORD.
VALVE FOR CONTROLLING FLUIDS.
APPLICATION FILED JUNE 21, 1905.
2 SHEETS—SHEET 2.
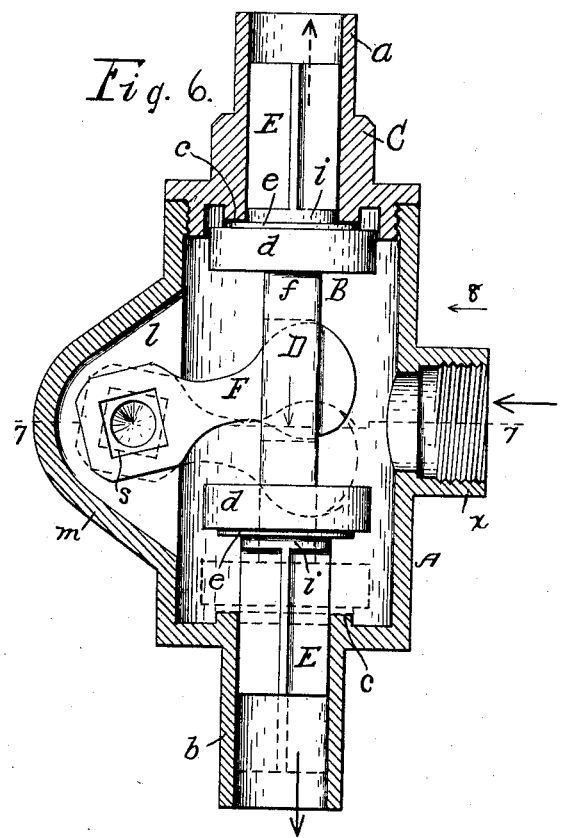
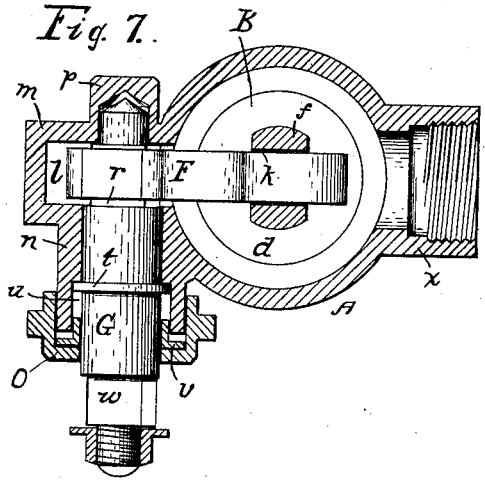
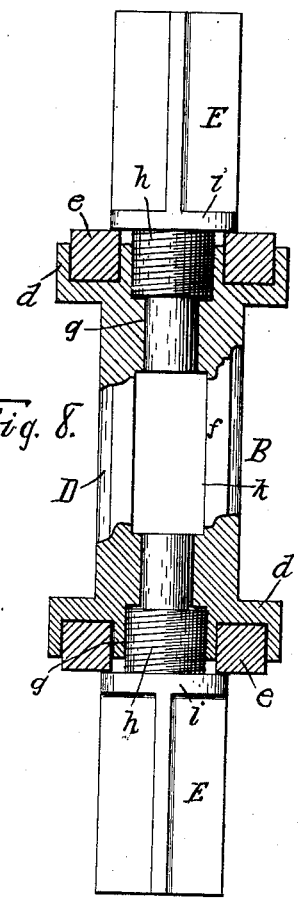
Attest:
M. B. Smith.
A. M. Whitmore.
Inventor:
George A. Mumford.
By E. B. Whitmore, Atty.

UNITED STATES PATENT OFFICE.

GEORGE A. MUMFORD, OF ROCHESTER, NEW YORK.

VALVE FOR CONTROLLING FLUIDS.

No. 829,120.  Specification of Letters Patent.  Patented Aug. 21, 1906.

Application filed June 21, 1905. Serial No. 266,275.

*To all whom it may concern:*

Be it known that I, GEORGE A. MUMFORD, of Rochester, in the county of Monroe and State of New York, have invented a new and useful Improvement in Valves for Controlling Fluids, which improvement is fully set forth in the following specification and shown in the accompanying drawings.

My present invention relates generally to the conducting of liquids or fluids through pipes, as in hot-water circulation, &c., but more particularly to the valves controlling the flow of such liquids or fluids, the invention being a three-way piston-valve designed as an improvement on the valves shown and set forth in Letters Patents Nos. 637,010 and 667,553, of dates November 14, 1899, and February 5, 1901, respectively.

One object of my present invention is to provide a double-acting flat-disk valve for controlling passages for liquids or fluids leading in opposite directions.

Another object of the invention is to provide better means than heretofore employed for moving the valve proper against one or the other of the opposing valve-seats.

Other objects and advantages of the invention will be brought out and made to appear in the following specification and the construction particularly pointed out in the appended claims, reference being had to the accompanying drawings, which, with the reference characters marked thereon, form a part of this specification.

In the drawings, Figure 1 is a side view of the body of the valve disconnected, the lever being omitted. Fig. 2 is a view of the same seen as indicated by arrow 2 in Fig. 1. Fig. 3 is a view of the body seen as indicated by arrow 3 in Fig. 1. Fig. 4 is an end view of the body indicated by arrow 4 in Fig. 1. Fig. 5 is a plan of the lever-spindle, detached. Fig. 6 is a central longitudinal section of the hollow body and the closing-cap on the dotted line 6 6 in Fig. 4, showing the interior parts, parts being shown in various positions by full and by dotted lines. Fig. 7 is a transverse section of parts taken on the dotted lines 7 7 in Figs. 1 and 6. Fig. 8 is a side elevation of the valve proper, detached, seen as indicated by arrow 8 in Fig. 6. Figs. 5 to 8, inclusive, are drawn to scales slightly larger than that of the remaining figures.

Referring to the parts shown, A in the va-
rious figures is the main part or body of the valve, it being a cylindrical metal shell or inclosing body, as of brass, for the valve proper, B, one end of the body A being fully open. C is a cylindrical cap for the open end of the body A, formed with a short tubular part *a* and threaded in the open end of the body A, as appears in Fig. 6. The opposite end of the body A is without removable parts and formed with a longitudinal tubular part *b*, corresponding with the part *a* of the cap C, said two tubular parts being coaxial with the main part or body A. These tubular parts extend in opposite directions away from the body A and constitute outflow-passages from said body, the inflow-passage being through a short tubular part *x* at the side of the body. The parts *a* and *b* are threaded externally at their outer ends for the purpose of coupling onto adjacent pipes in the usual manner, the part *x* being internally threaded for a like purpose. The cylindrical openings through the parts *a* and *b* are uniform in diameter, the circular walls of said openings terminating at their inner ends in inwardly-projecting valve-seats *c c*, facing toward each other.

The valve B, Figs. 6, 7, and 8, is formed with a pair of oppositely-turned hollow cylindrical heads *d d*, holding rings *e e*, as of hard rubber, in positions to meet the respective valve-seats *c c* as the valve B is given longitudinal motion within the shell or body A. The heads *d d* are connected by a longitudinal tie or member *f*, which, with the two heads *d d*, constitutes a single rigid body D, with the valve surfaces or disks of the rings *e e* turned in opposite directions. The body D of the valve is formed with axial openings *g g*, Fig. 8, at its ends, in which to receive winged stems E E, which stems when the valve B is in place within the body A occupy the respective cylindrical cavities of the two tubular parts *a b*, as shown, and in which the valve has longitudinal motion. The stems E E hold to place in the part D by threaded portions *h h*, and when thus in place the flanges *i i* of the stems press the respective rubber rings *e e*. The valve is provided with flanges bearing against the rings and out of contact with the walls of the recesses in the heads, as shown.

The valve B is formed with a rectangular opening *k*, Figs. 7 and 8, through the body D, in which to receive the free end of an operating-arm F, (see also Fig. 6,) the opposite end of the arm occupying a vertical chamber $l$ in a laterally-projecting longitudinally-disposed part $m$ at the side of the body A, Figs. 1, 3, 4, 6, and 7. The part $m$ is formed at one side with a short tubular lateral projection $n$, opening into the chamber $l$, (see Fig. 7,) threaded at its outer end to receive a screw-cap $o$, the axis of the part $n$ being at right angles with a plane coinciding with the axis of the body A. A spindle G, Figs. 1 to 5 and 7, is placed in the tubular part $n$ to cross the chamber $l$, having a squared portion $r$ to occupy a rectangular opening $s$, Fig. 6, in the arm F, by means of which when the spindle is turned one way or the other on its axis the valve B will be given corresponding longitudinal motions in the body A. The distance between the outwardly-turned faces of the rings $e\ e$ of the valve is less than the distance between the opposing valve-seats $c\ c$, and the above-mentioned longitudinal motions of the valve B serve to bring one or the other of the rings against its coacting valve-seat, and so temporarily close the outward passage through the tubular part $a$ or $b$, as the case may be. The spindle G has a bearing in a short projection $p$ of the part $m$, Fig. 7, beyond the chamber $l$, and it is formed with a flange $t$ in an enlarged chamber $u$ of the tubular part $n$, said annular chamber serving as a stuffing-box for holding some ordinary packing material for the spindle. A follower $v$ is provided for pressing the packing material against the flange $t$, the follower being pressed inward by the screw-cap $o$. The spindle G is further formed with a square part $w$ near its outer end for receiving a weighted actuating-lever H, Figs. 2 and 3, for turning the spindle to control the valve B. This lever H is flexible and elastic and of the nature of a spring, so as to cause the valve to meet and press the respective valve-seats with yielding action. This double-acting three-way valve is useful for controlling the flow through pipes of hot or cold water, steam, or other fluids, and in use it may occupy any position in which the spindle G is horizontal. Commonly the position of the body A is such that the inflow through the passage $x$ is in an upward direction; but this is wholly immaterial to the invention. In whatever position the body A may be the weighted lever H is so relatively disposed as to cause the valve B to normally close either outflow-opening from the body A, as may be desired.

What I claim as my invention, and desire to secure by Letters Patent, is—

1. A valve for controlling fluids, comprising a cylindrical inclosing body with integral lateral chamber, a cap for the opening at one end of said body, said cap and body having equal oppositely-extending tubular parts coaxial with the body, said tubular parts terminating in valve-seats at their inner ends within said body, a longitudinally-movable valve in said body having oppositely-turned heads, said heads having cylindrical recesses, elastic rings in said recesses and extended beyond the outer faces of said head in positions to meet said respective valve-seats and means for moving the valve longitudinally of said body, said valve having guiding means at opposite ends received in said tubular parts and provided with flanges bearing against said rings and out of contact with the walls of the recesses in said heads.

2. A valve for controlling fluids, comprising a cylindrical inclosing body with integral lateral chamber, a cap for the opening at one end of said body, said cap and body having equal oppositely-extending tubular parts coaxial with the body, said tubular parts terminating in valve-seats at their inner ends within said body, a longitudinally-movable valve in said body having oppositely-turned heads, said heads having cylindrical recesses, elastic rings in said recesses and extended beyond the outer faces of said head in positions to meet said respective valve-seats and means for moving the valve longitudinally of said body, said valve having guiding means at opposite ends received in said tubular parts and provided with flanges bearing against said rings and out of contact with the walls of the recesses in said heads, said operating means being supported in said chamber and having its free end loosely received in the valve-stem of said body.

In witness whereof I have hereunto set my hand, this 16th day of June, 1905, in the presence of two subscribing witnesses.

GEORGE A. MUMFORD.

Witnesses:
    ENOS B. WHITMORE,
    A. M. WHITMORE.